(12) United States Patent
Kanatani et al.

(10) Patent No.: US 10,097,733 B2
(45) Date of Patent: Oct. 9, 2018

(54) IMAGE CORRECTION PARAMETER OUTPUT APPARATUS, CAMERA SYSTEM AND CORRECTION PARAMETER OUTPUT METHOD

(71) Applicant: KYOCERA Corporation, Kyoto (JP)

(72) Inventors: Takayoshi Kanatani, Sagamihara (JP); Riyou Morishima, Tokyo (JP); Takahiro Okada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 222 days.

(21) Appl. No.: 15/032,910

(22) PCT Filed: Oct. 29, 2014

(86) PCT No.: PCT/JP2014/005471
§ 371 (c)(1),
(2) Date: Apr. 28, 2016

(87) PCT Pub. No.: WO2015/064095
PCT Pub. Date: May 7, 2015

(65) Prior Publication Data
US 2016/0269597 A1 Sep. 15, 2016

(30) Foreign Application Priority Data

Oct. 29, 2013 (JP) .................. 2013-224508

(51) Int. Cl.
*G06K 9/00* (2006.01)
*H04N 1/60* (2006.01)
(Continued)

(52) U.S. Cl.
CPC ........... *H04N 1/6027* (2013.01); *G03B 37/04* (2013.01); *G06T 5/003* (2013.01); *H04N 5/225* (2013.01);
(Continued)

(58) Field of Classification Search
CPC .. H04N 1/6027; H04N 5/225; H04N 5/23238; H04N 5/2351; H04N 5/247;
(Continued)

(56) References Cited

U.S. PATENT DOCUMENTS 7,903,887 B2* 3/2011 Sasaki .................... H04N 19/70
348/222.1
8,780,202 B2 7/2014 Yamada et al.
(Continued)

FOREIGN PATENT DOCUMENTS

JP 2007-141098 A 6/2007
JP 2007-243464 A 9/2007
(Continued)

OTHER PUBLICATIONS

International Search Report issued in PCT/JP2014/005471; dated Feb. 3, 2015.
(Continued)

*Primary Examiner* — Jonathan S Lee
(74) *Attorney, Agent, or Firm* — Studebaker & Brackett PC

(57) ABSTRACT

In order to output an image correction parameter that allows the visibility of a combined image of an area surrounding a moving object to be improved, an image correction parameter output apparatus (22) includes a memory (24) configured to store a group of correction parameters of a plurality of patterns for correcting a plurality of images of an area surrounding a moving object (15) captured with partially overlapped with each other by associating the group with the control information of the moving object (15), a control information acquisition unit (23) configured to acquire the control information of the moving object (15), and an output unit (25) configured to output a group of correction parameters corresponding to the acquired control information.

9 Claims, 8 Drawing Sheets

| Pattern No. | State | Control information | Correction parameter | | | |
|---|---|---|---|---|---|---|
| | | | Front camera | Rear camera | Right side camera | Left side camera |
| 1 | Daytime | Time : 7 to 17 | Color: Reference value Luminance: Reference value | Color: Reference value Luminance: Reference value | Color: Reference value Luminance: Reference value | Color: Reference value Luminance: Reference value |
| 2 | Night (Head lamp ON) | Time : 17 to 7 Head lamp: ON | Color: Same as the reference value Luminance: Same as the reference value | Color: Increase the saturation Luminance: Increase the luminance | Color: Increase the saturation Luminance: Increase the luminance | Color: Increase the saturation Luminance: Increase the luminance |
| 3 | Night (Head/Tail lamps ON) | Time : 17 to 7 Head lamp: ON Tail lamp: ON | Color: Same as the reference value Luminance: Same as the reference value | Color: Decrease red (weak) Luminance: Increase the luminance | Color: Increase the saturation Luminance: Increase the luminance | Color: Increase the saturation Luminance: Increase the luminance |
| 4 | Night (Head/Brake lamps ON) | Time : 17 to 7 Head lamp: ON Brake lamp: ON | Color: Same as the reference value Luminance: Same as the reference value | Color: Decrease red (strong) Luminance: Increase the luminance | Color: Increase the saturation Luminance: Increase the luminance | Color: Increase the saturation Luminance: Increase the luminance |
| 5 | Night (lights OFF) | Time : 17 to 7 | Color: Increase the saturation Luminance: Increase the luminance | Color: Increase the saturation Luminance: Increase the luminance | Color: Increase the saturation Luminance: Increase the luminance | Color: Increase the saturation Luminance: Increase the luminance |
| ... | ... | ... | ... | ... | ... | ... |

(51) Int. Cl.
*H04N 5/225* (2006.01)
*H04N 5/232* (2006.01)
*H04N 5/235* (2006.01)
*G03B 37/04* (2006.01)
*G06T 5/00* (2006.01)
*H04N 5/247* (2006.01)
*H04N 5/265* (2006.01)
*H04N 5/238* (2006.01)

(52) U.S. Cl.
CPC ....... *H04N 5/2351* (2013.01); *H04N 5/23238* (2013.01); *H04N 5/247* (2013.01); *H04N 5/265* (2013.01); *H04N 5/238* (2013.01)

(58) Field of Classification Search
CPC ........ H04N 6/265; H04N 5/238; G03B 37/04; G06T 5/003
See application file for complete search history.

(56) References Cited

U.S. PATENT DOCUMENTS

| | | | |
|---|---|---|---|
| 2002/0196340 A1 | 12/2002 | Kato et al. | |
| 2010/0302347 A1* | 12/2010 | Shikata | H04N 5/232 348/36 |
| 2010/0329553 A1* | 12/2010 | Shiokawa | H04N 5/202 382/167 |
| 2011/0074916 A1* | 3/2011 | Demirdjian | B60R 1/00 348/36 |
| 2011/0234801 A1 | 9/2011 | Yamada et al. | |
| 2011/0285848 A1 | 11/2011 | Han et al. | |
| 2015/0042800 A1* | 2/2015 | Choi | B60R 1/002 348/148 |
| 2016/0162740 A1* | 6/2016 | Takemura | G06K 9/00791 348/148 |
| 2016/0234436 A1* | 8/2016 | Yu | H04N 5/23238 |
| 2016/0368417 A1* | 12/2016 | Bassi | H04N 9/09 |

FOREIGN PATENT DOCUMENTS

| | | |
|---|---|---|
| JP | 2010-116196 A | 5/2010 |
| JP | 2011-049735 A | 3/2011 |
| JP | 2011-205375 A | 10/2011 |
| WO | 2006/022630 A1 | 3/2006 |
| WO | WO 2006022630 A1 * | 3/2006 ............... B60R 1/00 |

OTHER PUBLICATIONS

Written Opinion issued in PCT/JP2014/005471; dated Feb. 3, 2015; with English language Concise Explanation.
The extended European search report issued by the European Patent Office on Feb. 17, 2017, which corresponds to European Patent Application No. 14858173.9-1902 and is related to U.S. Appl. No. 15/032,910.

* cited by examiner

FIG. 4

| Pattern No. | State | Control information | Correction parameter | | | |
|---|---|---|---|---|---|---|
| | | | Front camera | Rear camera | Right side camera | Left side camera |
| 1 | Daytime | Time: 7 to 17 | Color: Reference value<br>Luminance: Reference value | Color: Reference value<br>Luminance: Reference value | Color: Reference value<br>Luminance: Reference value | Color: Reference value<br>Luminance: Reference value |
| 2 | Night<br>(Head lamp ON) | Time: 17 to 7<br>Head lamp: ON | Color: Same as the reference value<br>Luminance: Same as the reference value | Color: Increase the saturation<br>Luminance: Increase the luminance | Color: Increase the saturation<br>Luminance: Increase the luminance | Color: Increase the saturation<br>Luminance: Increase the luminance |
| 3 | Night<br>(Head/Tail lamps ON) | Time: 17 to 7<br>Head lamp: ON<br>Tail lamp: ON | Color: Same as the reference value<br>Luminance: Same as the reference value | Color: Decrease red (weak)<br>Luminance: Increase the luminance | Color: Increase the saturation<br>Luminance: Increase the luminance | Color: Increase the saturation<br>Luminance: Increase the luminance |
| 4 | Night<br>(Head/Brake lamps ON) | Time: 17 to 7<br>Head lamp: ON<br>Brake lamp: ON | Color: Same as the reference value<br>Luminance: Same as the reference value | Color: Decrease red (strong)<br>Luminance: Increase the luminance | Color: Increase the saturation<br>Luminance: Increase the luminance | Color: Increase the saturation<br>Luminance: Increase the luminance |
| 5 | Night<br>(lights OFF) | Time: 17 to 7 | Color: Increase the saturation<br>Luminance: Increase the luminance | Color: Increase the saturation<br>Luminance: Increase the luminance | Color: Increase the saturation<br>Luminance: Increase the luminance | Color: Increase the saturation<br>Luminance: Increase the luminance |
| ... | | ... | ... | ... | ... | ... |

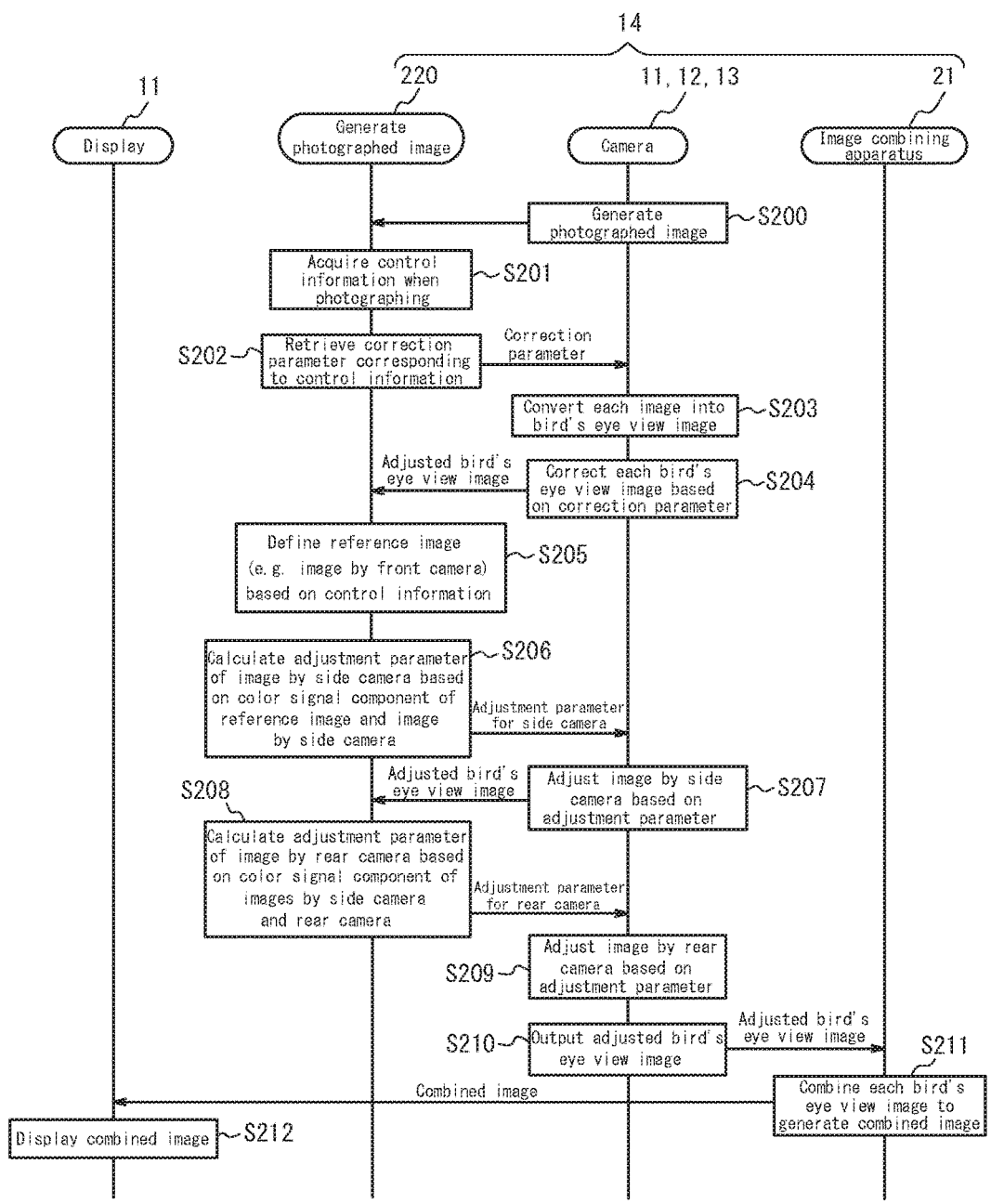

IMAGE CORRECTION PARAMETER OUTPUT APPARATUS, CAMERA SYSTEM AND CORRECTION PARAMETER OUTPUT METHOD

CROSS-REFERENCE TO RELATED APPLICATIONS

This application claims priority of Japanese Patent Application No. 2013-224508 filed on Oct. 29, 2013, the entire contents of which are incorporated herein by reference.

TECHNICAL FIELD

This disclosure relates to an image correction parameter output apparatus that outputs parameters used for correcting photographed images, a camera system and a correction parameter output method.

BACKGROUND

An around view monitor system is known in which a plurality of onboard cameras are mounted on a moving object such as a car and images of the area surrounding the moving object are captured by the cameras, and by use of a plurality of generated images, a combined image that provides a bird's eye view of the area surrounding the moving object is displayed. In such a system, a technique by which a visual continuity is provided to each seam between photographed images is known (for example, PLT 1).

CITATION LIST

Patent Literature

PTL 1: JP2010-116196 (A)

SUMMARY

In order to ensure the visibility of images, in general, the color and the brightness of an image is corrected by using a predetermined correction parameter. However, the visibility of a combined image could have been declined depending on the environment surrounding the moving object or the state thereof. For example, an appropriate correction parameter value for ensuring the visibility to various light sources around the moving object is not necessarily constant. Thus, in some cases, a combined image could not have ensured sufficient visibility to various states of a moving object.

It would therefore be helpful to provide an image correction parameter output apparatus configured to output an image correction parameter that allows the visibility of a combined image of an area surrounding a moving object to be improved, a camera system and a correction parameter output method.

In order to solve the above described problem, an image correction parameter output apparatus according to this disclosure includes:

a memory configured to store a group of correction parameters of a plurality of patterns for correcting a plurality of images of an area surrounding a moving object captured with partially overlapped with each other by associating the group with control information of the moving object;

a control information acquisition unit configured to acquire the control information of the moving object; and an output unit configured to output a group of correction parameters corresponding to the acquired control information.

Furthermore, in the correction parameter output apparatus according to this disclosure, it is preferred that the output unit outputs a different group of correction parameters depending on whether or not the control information includes the information indicating lighting of lights of the moving object.

Moreover, in the correction parameter output apparatus according to this disclosure, the group of correction parameters includes a color correction parameter for correcting to reduce a difference in color between the plurality of images.

Furthermore, the correction parameter output apparatus according to this disclosure further includes:

an image acquisition unit configured to acquire a plurality of images corrected based on the group of correction parameters outputted by the output unit; and an adjustment parameter calculator configured to define one of the plurality of corrected images as a reference image, and based on a color signal component in an overlapped area between the reference image and another corrected image, calculate a color adjustment parameter for adjusting the another corrected image, wherein the output unit outputs the calculated color adjustment parameter.

Moreover, in the correction parameter output apparatus according to this disclosure, it is preferred that the image acquisition unit acquires an image adjusted based on the color adjustment parameter outputted by the output unit;

the adjustment parameter calculator calculates the color adjustment parameter for adjusting the corrected image based on a color signal component in an overlapped area between the adjusted image and a corrected image different from the reference image; and the output unit outputs the calculated color adjustment parameter.

Furthermore, in the correction parameter output apparatus according to this disclosure, it is preferred that the reference image is defined from among the plurality of corrected images based on the control information.

Moreover, in the correction parameter output apparatus according to this disclosure, it is preferred that the reference image is defined from among the plurality of corrected images based on the information indicating a direction of travel of the moving object included in the control information.

Furthermore, a camera system according to this disclosure includes:

a plurality of image-taking units configured to generate a plurality of images of an area surrounding a moving object captured with partially overlapped with each other;

a memory configured to store a group of correction parameters of a plurality of patterns for correcting the plurality of images by associating the group with control information of the moving object;

a control information acquisition unit configured to acquire the control information of the moving object;

an output unit configured to output a group of correction parameters corresponding to the acquired control information;

an image processor configured to correct the plurality of images based on a correction parameter outputted by the output unit; and an image combining unit configured to combine the plurality of corrected images to generate a combined image.

Moreover, an image correction parameter output method according to this disclosure includes the steps of:

storing a group of correction parameters of a plurality of patterns for correcting a plurality of images of an area surrounding a moving object captured with partially overlapped with each other by associating the group with control information of the moving object;

acquiring the control information of the moving object; and outputting a group of correction parameters corresponding to the acquired control information.

According to the disclosed image correction parameter output apparatus, camera system and correction parameter output method, a correction parameter for an image for improving the visibility of a combined image of an area surrounding a moving object can be outputted.

BRIEF DESCRIPTION OF THE DRAWINGS

In the accompanying drawings:

FIG. 4 is a diagram illustrating an example of a group of correction parameters stored in a memory of FIG. 1;

FIG. 8 is a flow chart illustrating an operation of the camera system of FIG. 7.

DETAILED DESCRIPTION

Figure 1:
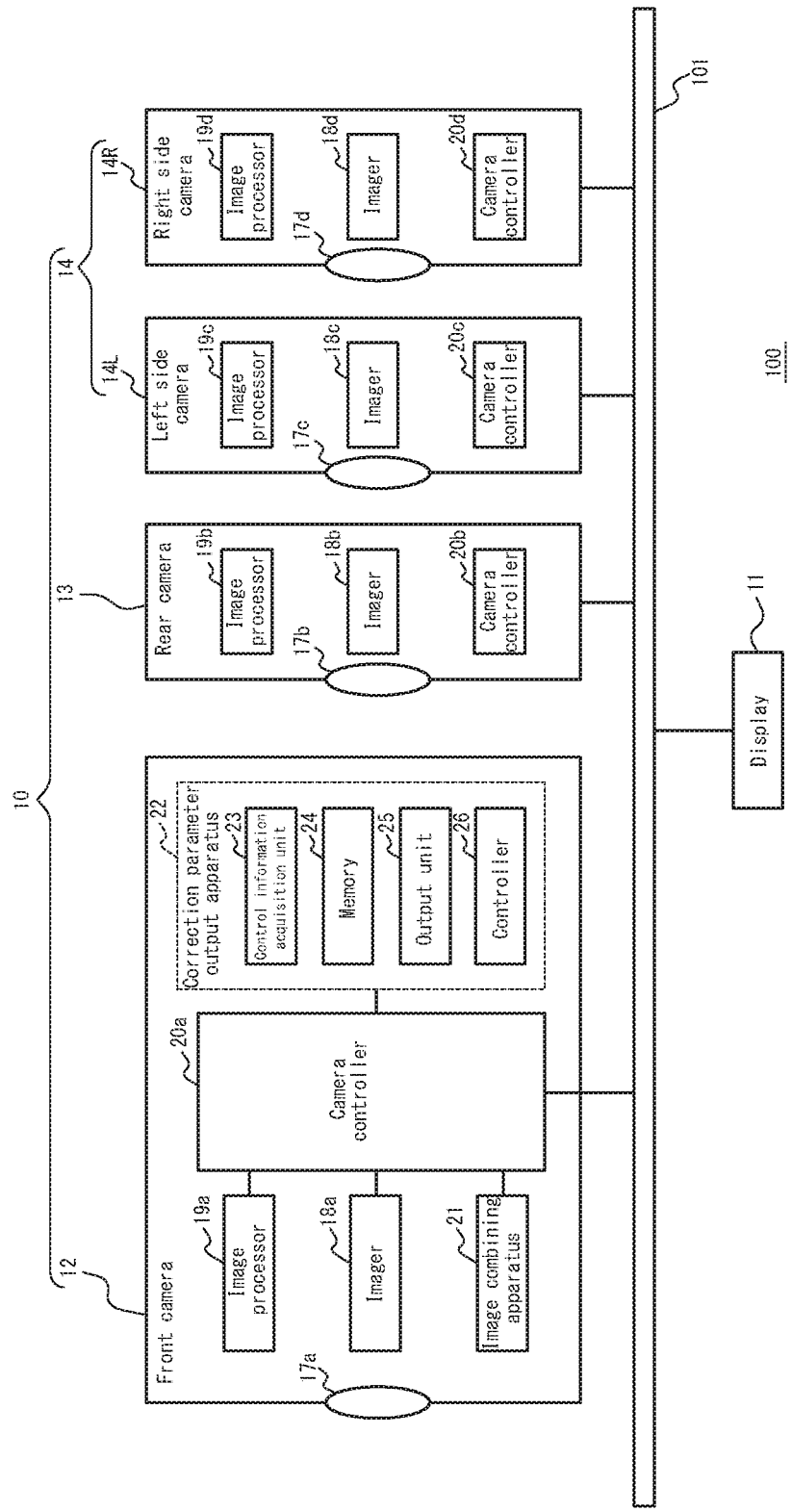
FIG. 1 is a function block diagram illustrating a schematic configuration of a camera system according to a first embodiment of this disclosure.

The following describes embodiments of this disclosure with reference to the drawings First Embodiment First, a correction parameter output apparatus and a camera system according to a first embodiment of this disclosure will be described. FIG. 1 is a function block diagram illustrating a schematic configuration of the camera system according to the first embodiment of this disclosure.

As illustrated in FIG. 1, a camera system 100 includes an image capturing apparatus 10 and a display apparatus 11. The image capturing apparatus 10 has a plurality of image-taking units, which is, in this embodiment, for example, a front camera 12, a rear camera 13 and side cameras 14 (a left side camera 14L and a right side camera 14R).

Figure 2:
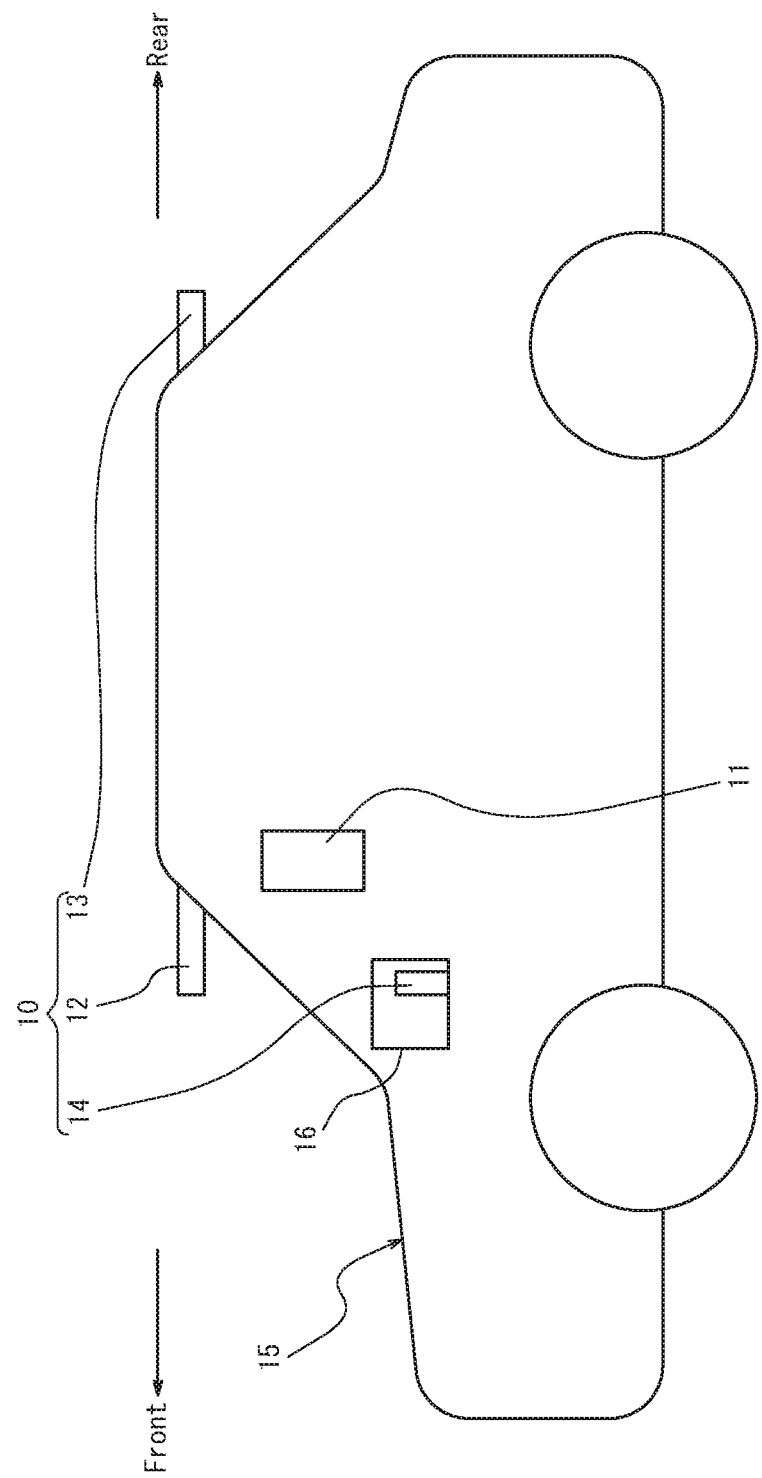
FIG. 2 is a schematic diagram illustrating disposition of components of the camera system of FIG. 1.

As illustrated in FIG. 2, the display apparatus 11 is disposed at a position that is visible from a driver's seat. The front camera 12 is disposed such that it can capture images of the surrounding area in front of a moving object 15. The rear camera 13 is disposed such that it can capture images of the surrounding area behind the moving object 15. The side cameras 14 are disposed vertically downward at the left and right door mirrors 16, respectively, for example, such that they can capture images of the surrounding area on both sides of the moving object 15. In addition, the side cameras 14 are disposed symmetrically on the left and right sides of the moving object 15.

Figure 3:
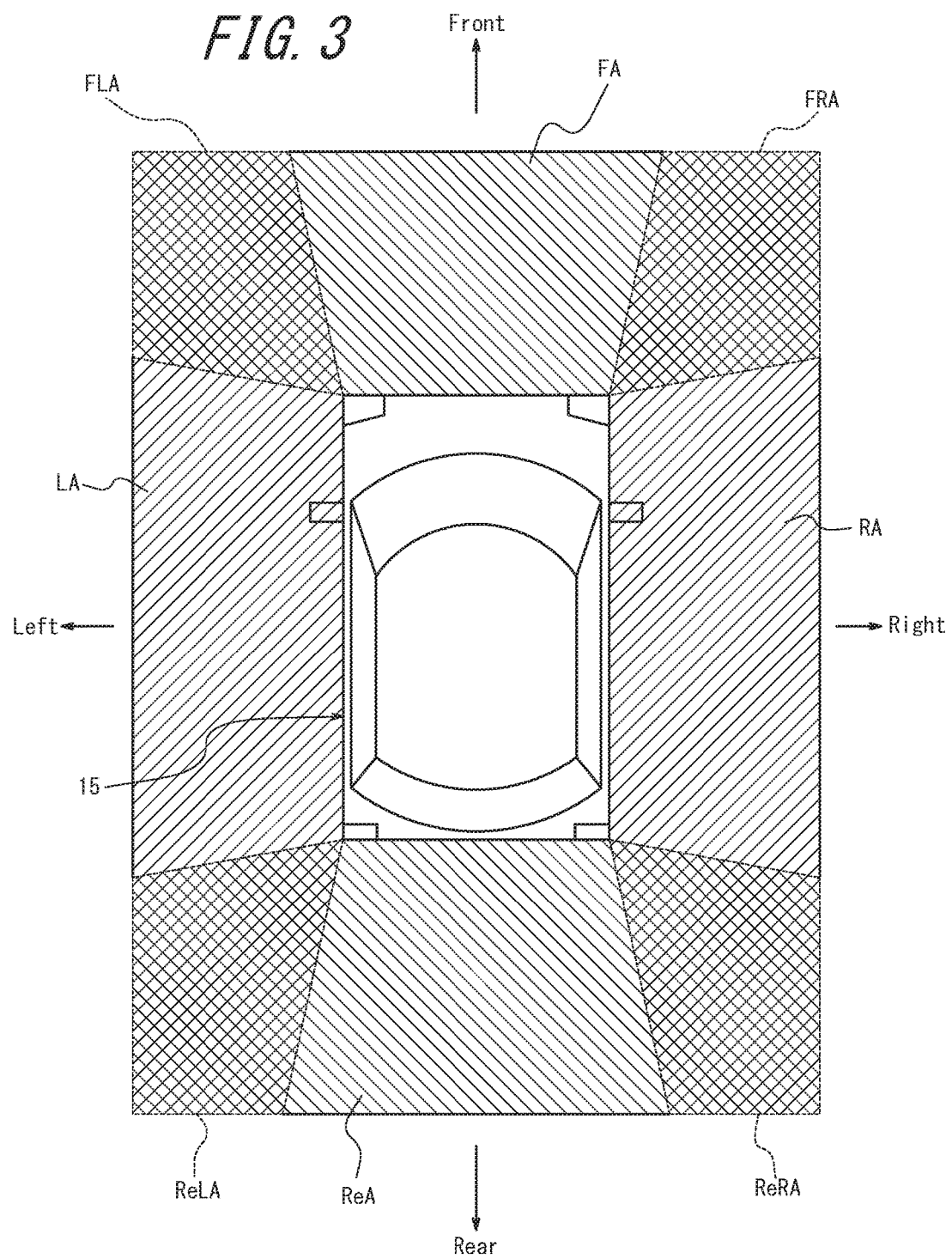
FIG. 3 is a schematic diagram illustrating an image-taking range by an image capturing apparatus of FIG. 1.

The front camera 12, the rear camera 13 and the side cameras 14 each include a lens having a wide angle of view, such as a fish-eye lens, and can capture an image of the area surrounding the moving object 15 in a wide angle. As illustrated in FIG. 3, the image-taking range of the front camera 12 includes the front area FA of the moving object 15. The image-taking range of the rear camera 13 includes the rear area ReA of the moving object 15. The image-taking range of the left side camera 14L and the image-taking range of the right side camera 14R include, respectively, the left side area LA and the right side area RA of the moving object 15.

The image-taking range of each camera, 12, 13, 14L and 14R includes areas around four corners of the moving object 15 overlapped with each other. More specifically, the image-taking range of the front camera 12 and the image-taking ranges of the side cameras 14 (14L and 14R) include the left front area FLA and right front area FRA of the moving object 15 overlapped with each other. Further, the image-taking range of the rear camera 13 and the image-taking ranges of the side cameras 14 (14L and 14R) include the left rear area ReLA and the right rear area ReRA of the moving object 15 overlapped with each other. Hereinafter the areas surrounding the moving object 15 where the image-taking ranges of each camera 12, 13, 14L and 14R are overlapped with each other are referred to as overlapped areas (FLA, FRA, ReLA and ReRA).

Next, the configuration of the image-taking unit (the front camera 12, the rear camera 13, the side cameras 14) will be described. The front camera 12 includes an optical system 17a, an imager 18a, an image processor 19a, a camera controller 20a, an image combining apparatus (image combining unit) 21 and a correction parameter output apparatus 22 (see FIG. 1).

The optical system 17a is configured by including a plurality of lenses and forms an object image. In this embodiment, the optical system 17a has a wide angle of view, and as described above, can form an object image included in the area surrounding the moving object 15.

The imager 18a is a CMOS image sensor, for example, and generates a photographed image of an object image formed by the optical system 17a.

The image processor 19a treats an image generated by the imager 18a with image processing such as image transform, color correction, gamma correction and luminance correction. Further, the image processor 19a outputs an image treated with image processing.

The image processor 19a converts a wide-angle photographed image generated by the imager 18a into a bird's eye view image through image conversion. That is, through image conversion, a photographed image that is generated by a wide-angle shot and has generally a distorted periphery is converted into a bird's eye view image of the area surrounding the moving object 15 that is viewed vertically downward from above the moving object 15. More specifically, the image processor 19a converts a photographed image by the imager 18a into a bird's eye view image in the front area FA and the overlapped areas FLA and FRA (FIG. 3) of the moving object 15.

The image processor 19a corrects the color of the photographed image or the bird's eye view image by color correction. For color correction, the image processor 19a acquires a color correction parameter from the correction parameter output apparatus 22. For example, the image processor 19a performs color correction by multiplying a specific color signal component of the photographed image or the bird's eye view image by the acquired color correction parameter.

The image processor 19a corrects non-linearity between the input signal and the emission intensity of the display apparatus 11 by a normal gamma correction, for example.

The image processor 19a corrects the luminance of a photographed image or a bird's eye view image by a luminance correction. For a luminance correction, the image processor 19a acquires a luminance correction parameter from the correction parameter output apparatus 22. For example, the image processor 19a performs a luminance correction by multiplying the luminance signal component of the photographed image or the bird's eye view image by the acquired luminance correction parameter.

The camera controller 20a (see FIG. 1) controls operation of each unit of the front camera 12. For example, the camera controller 20a allows the imager 18a to capture an image of the area surrounding the moving object 15 in synchronization with the rear camera 13 and the side cameras 14, and to periodically generate images at 30 fps, for example. Further, the camera controller 20a sends and receives the information via an onboard network 101 or an exclusive line.

The image combining apparatus 21 combines images outputted respectively by the image processors 19a, 19b, 19c and 19d of the front camera 12, the rear camera 13 and the side cameras 14L and 14R to generate a combined image. The combined image is, for example, a bird's eye view image of all area surrounding the moving object 15. As for the bird's eye view image of all area surrounding the moving object according to this embodiment, an image by the front camera 12, an image by the rear camera 13, and each image by side cameras 14L and 14R are used respectively for the front area FA and the overlapped areas FLA and FRA, the rear area ReA and the overlapped areas ReLA and ReRA, and the areas on the left side LA and the right side RA of the moving object (see FIG. 3). Further, the image combining apparatus 21 outputs the combined image that has been generated to the display apparatus 11.

The correction parameter output apparatus 22 (see FIG. 1) includes a control information acquisition unit 23, a memory 24, an output unit 25 and a controller 26.

The control information acquisition unit 23 acquires the control information of the moving object 15. In this embodiment, the control information includes a variety of information relating to the time information and the state of the moving object 15. The a variety of information relating to the state of the moving object 15 includes, for example, the information indicating lighting on or off of the lights (a head lamp, a tail lamp and a brake lamp) of the moving object 15. The control information acquisition unit 23 can acquire the control information in any method and, for example, it may acquire from the moving object 15 via the onboard network 101 or may acquire wired or wirelessly the control information outputted by the other components of the moving object 15.

The memory 24 stores a group of correction parameters of a plurality of patterns associated respectively with a variety of control information. The group of correction parameters is defined previously by experiments or simulations.

For example, as illustrated in the pattern 1 of FIG. 4, when the state is "daytime," the correction parameters (color correction parameter and luminance correction parameter) of each camera 12, 13, 14L and 14R included in a corresponding group of correction parameters are the same. With respect to determination of the state, when the time information included in the control information is "7 a.m. to 17 p.m.," the state is determined to be "daytime."

When the state is daytime, in many cases, various objects in the image-taking range of each camera 12, 13, 14L and 14R are illuminated by the same light source such as the sunlight. Thus, a common value (reference value) for executing a usual white balance is used as each correction parameter, thereby allowing the color and the luminance of each image captured by each camera 12, 13, 14L and 14R to be adjusted so that they are visually perceived as the same on average.

On the other hand, as illustrated in the pattern 2 of FIG. 4, for example, when the state is "night" (head lamp ON), the correction parameter of the front camera 12 is a reference value. In addition, in the correction parameters of the rear camera 13 and the side cameras 14L and 14R, the color correction parameter is defined so as to increase the color saturation of the image, and the luminance correction parameter is defined so as to increase the luminance of the image. For determination of the state, when the time information included in the control information indicates "17 p.m. to 7 a.m." and the control information includes the information indicating lighting on of the head lamp (white), the state is determined to be "night (head lamp ON)."

In the case of night, when only the front of the moving object 15 is illuminated by the head lamp, the brightness and the saturation of images of the object in front of the moving object is higher than those of the object on the left and the right sides and the rear of the moving object. Thus, by using the above-described correction parameter, the color and the luminance of images captured by each camera 12, 13, 14L and 14R are adjusted to be visually perceivable as the same on average.

Further, as illustrated by the pattern 3 of FIG. 4, for example, when the state is "night (head/tail lamps are ON)," the correction parameter of the front camera 12 is a reference value. In addition, in the correction parameter of the rear camera 13, the color correction parameter is defined so as to reduce (weaken) redness of the image, and the luminance correction parameter is defined so as to increase the luminance of the image. Further, in the correction parameter of the side cameras 14L and 14R, the color correction parameter is defined so as to increase the saturation of the image, and the luminance correction parameter is defined so as to increase the luminance of the image. For determination of the state, when the time information included in the control information indicates "17 p.m. to 7 a.m." and the control information includes the information indicating lighting on of the head lamp (white) and the tail lamp (red), the state is determined to be "night (head/tail lamps ON)."

In the case of night, when only the rear of the moving object 15 is illuminated by the red tail light, the object behind the moving object is captured as an image with stronger redness compared to that of the objects on the left and the right sides and the front of the moving object. Thus, by using the above-described correction parameter, the color and the luminance of images captured by each camera 12, 13, 14L and 14R are adjusted to be visually perceivable as the same on average.

Moreover, as illustrated by the pattern 4 of FIG. 4, for example, when the state is "night (head/brake lamps are ON), the correction parameter of the front camera 12 is a reference value. In addition, in the correction parameter of the rear camera 13, the color correction parameter is defined so as to increase (strong) the redness of the image, and the luminance correction parameter is defined so as to increase the luminance of the image. In addition, in the correction parameter of the side cameras 14L and 14R, the color correction parameter is defined so as to increase the saturation of the image, and the luminance correction parameter is defined so as to increase the luminance of the image. For determination of the state, when the time information included in the control information indicates "17 p.m. to 7 a.m." and the control information includes the information indicating lighting on of the head lamp (white) and the brake lamp (red), the state is determined to be "night (head/brake lamps ON)."

In the case of night, when only the rear of the moving object 15 is illuminated by the red brake lamp, the object behind the moving object is captured as an image with stronger redness compared to that of the objects on the left and the right sides and the front of the moving object. In general, the brake lamp is lighter and more reddish than the tail lamp. Thus, by using the above-described correction parameter, the color and the luminance of images captured by each camera 12, 13, 14L and 14R are adjusted to be visually perceivable as the same on average.

Moreover, as illustrated by the pattern 5 of FIG. 4, for example, when the state is "night (lamps are OFF)," in the correction parameter of the front camera 12, the rear camera 13 and the side cameras 14L and 14R, the color correction parameter is defined so as to increase the saturation of the image, and the luminance correction parameter is defined so as to increase the luminance of the image. For determination of the state, when the time information included in the control information indicates "17 p.m. to 7 a.m.," the state is determined to be "night (lamps OFF)."

In the case of night, when all lamps of the moving object 15 are turned off, the brightness and the saturation of the images of the objects around the moving object 15 are low compared to those of the daytime. Thus, by using the above-described correction parameter, the color and the luminance of images captured by each camera 12, 13, 14L and 14R are adjusted to be visually perceivable as the same on average.

The output unit 25 (see FIG. 1) outputs a correction parameter included in a group of correction parameters corresponding to the control information acquired by the control information acquisition unit 23 to the image processors 19a, 19b, 19c and 19d of each camera 12, 13, 14L and 14R.

The controller 26 controls operation of each unit of the correction parameter output apparatus 22. For example, the controller 26 allows the control information acquisition unit 23 to acquire the control information of the moving object 15 simultaneously with the image generation by the imagers 18a, 18b, 18c and 18d of each camera 12, 13, 14L and 14R, and allows the output unit 25 to output a correction parameter periodically. Further, the controller 26 sends and receives the information via the onboard network 101 or an exclusive line.

The rear camera 13 and the side cameras 14 (14L and 14R) (see FIG. 1) include, as with the front camera 12, the optical systems 17b, 17c and 17d, imagers 18b, 18c and 18d, image processors 19b, 19c and 19d and camera controllers 20b, 20c and 20d, respectively. The function and the configuration of the optical systems, 17b, 17c and 17d, the imagers 18b, 18c and 18d, the image processors 19b, 19c and 19d and the camera controllers 20b, 20c and 20d are the same as those of the front camera 12.

For example, the image processor 19b of the rear camera 13 converts an image captured by the imager 18b of the rear camera 13 into a bird's eye view image of the rear area ReA and the overlapped areas ReLA and ReRA. In addition, the image processor 19c of the left side camera 14L converts an image captured by the imager 18c of the left side camera 14L into a bird's eye view image of the left side area LA and the overlapped areas FLA and ReLA. Further, the image processor 19d of the right side camera 14R converts an image captured by the imager 18d of the right side camera 14 into a bird's eye view image of the right side area RA and the overlapped areas FRA and ReRA.

The display apparatus 11 is an LCD, for example, and can display a moving image in real-time. The display apparatus 11 acquires a combined image outputted by the image combining apparatus 21 and displays the image. The display apparatus 11 is configured by a touch panel, for example, and may function as an interface that accepts the user operation. Further, the display apparatus 11 can send and receive the information via the onboard network 101 or an exclusive line.

Figure 5:
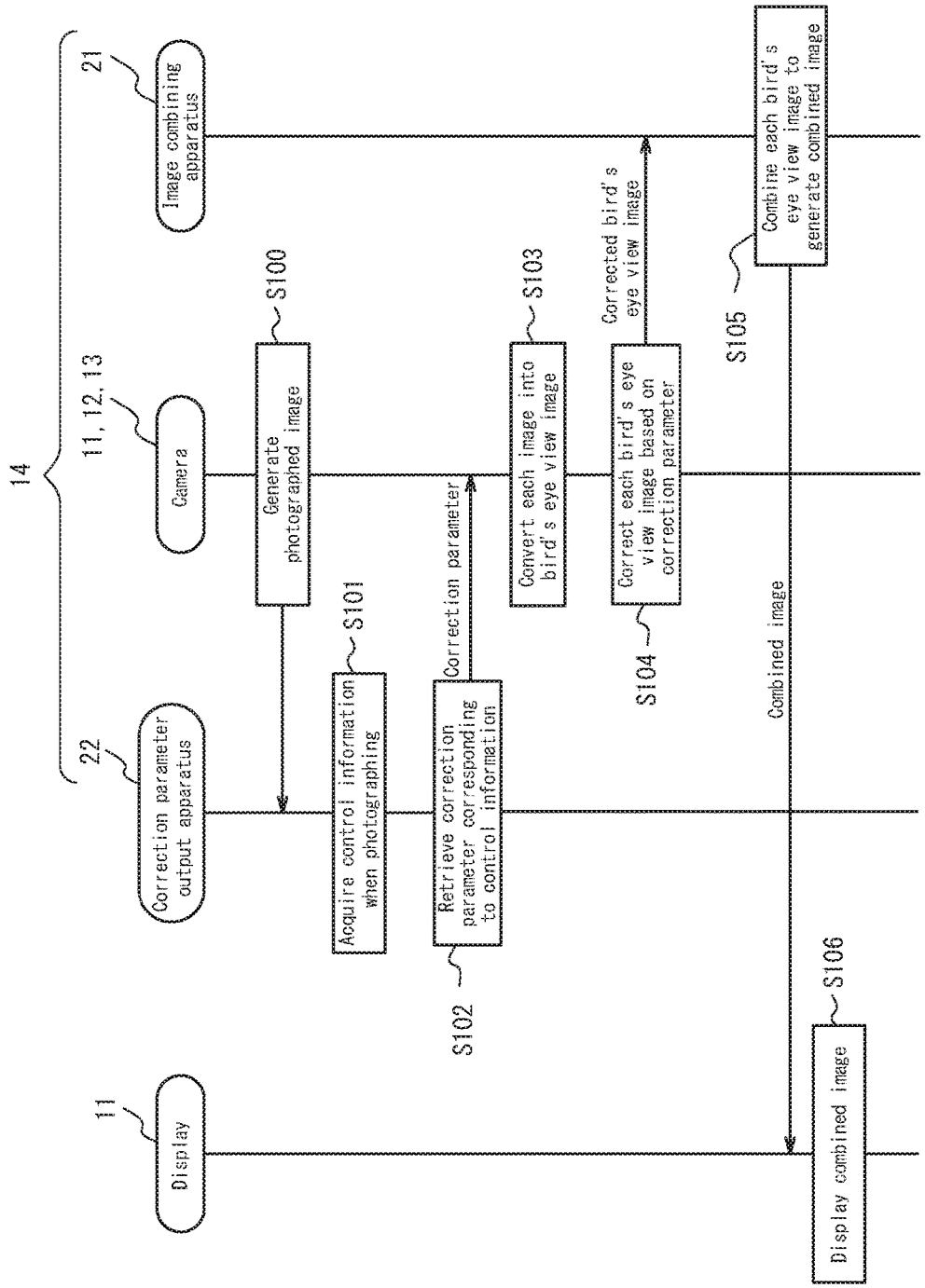
FIG. 5 is a flow chart illustrating an operation of the camera system of FIG. 1.

Next, the processing executed by the camera system 100 according to the first embodiment will be described with reference to the flow chart of FIG. 5. This processing is started when the image capturing apparatus 10 is activated, for example, and is executed repeatedly until a termination instruction is given by the user.

First, camera controllers 20a, 20b, 20c and 20d of each camera 12, 13, 14L and 14R control imagers 18a, 18b, 18c and 18d, respectively, and generate photographed images of the area surrounding the moving object 15 (step S100).

Next, the controller 26 of the correction parameter output apparatus 22 controls the control information acquisition unit 23 and acquires the control information at the time when each camera 12, 13, 14L and 14R captures images (step S101). The control information includes the time information and the information indicating lighting on of the lights (a head lamp, a tail lamp and a brake lamp) of the moving object 15.

Subsequently, the controller 26 retrieves a group of correction parameters corresponding to the control information of step S101 from a group of correction parameters of a plurality of patterns stored in the memory 24 (step S102) and outputs a correction parameter to each camera 12, 13, 14L and 14R.

Next, the camera controllers 20a, 20b, 20c and 20d of each camera 12, 13, 14L and 14R control the image processor 19 and convert the images generated at step S100 into bird's eye view images, respectively (step S103).

Subsequently, each camera controller 20a, 20b, 20c and 20d controls the image processors 19a, 19b, 19c and 19d and corrects the bird's eye view images of step S103, respectively, based on the correction parameter of step S102 (step S104), and outputs the corrected bird's eye view images to the image combining apparatus 21.

Next, the image combining apparatus 21 generates a combined image of a plurality of corrected bird's eye view images of step S104 (step S105) and outputs the image to the display apparatus 11.

Then, the display apparatus 11 displays the combined image of step S105 (step S106).

In this manner, according to the image correction parameter output apparatus of the first embodiment, correction parameters for correcting a plurality of images are outputted based on the control information of the moving object 15, and thus, as described below, allowing a correction adapted to various states of the moving object 15, and the visibility of a combined image can be improved.

Figure 6A:
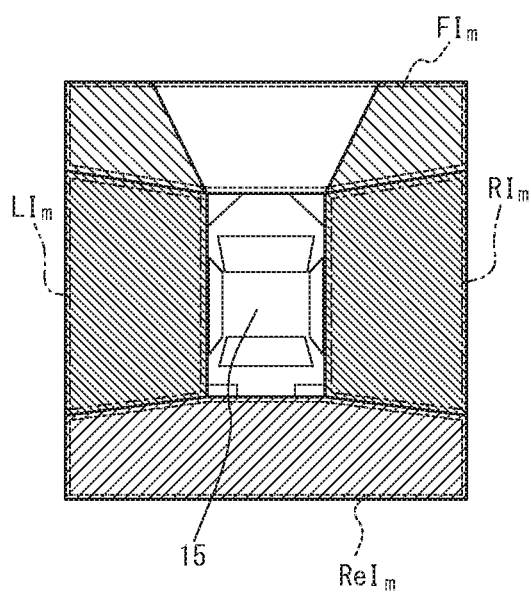
FIGS. 6(a) and 6(b) are diagrams illustrating an example of a combined image surrounding the moving object.
Figure 6B:
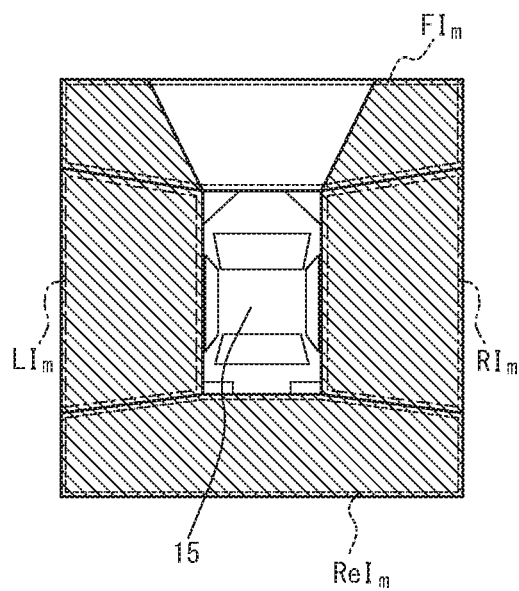

For example, when the head lamp is lighting in the night, the area ahead of the moving object 15 is illuminated by the white light of the head lamp, thus the image of the object ahead of the moving object 15 is more whitish compared to the images of the objects on the left and right sides and the rear of the moving object. Therefore, as illustrated in FIG. 6(*a*), the images of the left and the right FIm areas by the front camera 12 and the images LIm and RIm by the side camera 14 are different in the average color and luminance. In the same manner, when the tail lamp or the brake lamp is lighting in the night, the area behind the moving object 15 is illuminated by the red light of the tail lamp or the brake lamp, thus the image of the object behind the moving object 15 is more reddish compared to the images of the objects on the left and right sides and the front of the moving object. Therefore, the entire image ReIm by the rear camera 13 and the images LIm and Rim by the side camera 14 are different in the average color and luminance.

The correction parameter output apparatus according to the first embodiment retrieves a group of correction parameters corresponding to the control information of the moving object 15 from a group of correction parameters of a plurality of patterns stored previously in the memory 24 and outputs it. In this manner, image processors 19*a*, 19*b*, 19*c* and 19*d* of each camera 12, 13, 14L and 14R can, corresponding to the various states of the moving object 15, correct the color and the luminance of each photographed image to those that can be visually perceived as the same on average (see FIG. 6(*b*)).

Further, in the first embodiment, a different correction parameter is outputted depending on whether or not the control information includes the information indicating lighting on of lights of the moving object 15. Thus, the difference in the color and the luminance of each image depending on whether lights of the moving object 15 are lighting on or not can be reduced, thereby further improving the visibility of a combined image.

Second Embodiment

Next, the second embodiment of this disclosure will be described. Although the configuration of the camera system 100 according to the second embodiment is the same as that of the first embodiment, the function of the image processor and the configuration of the correction parameter output apparatus are different.

Figure 7:
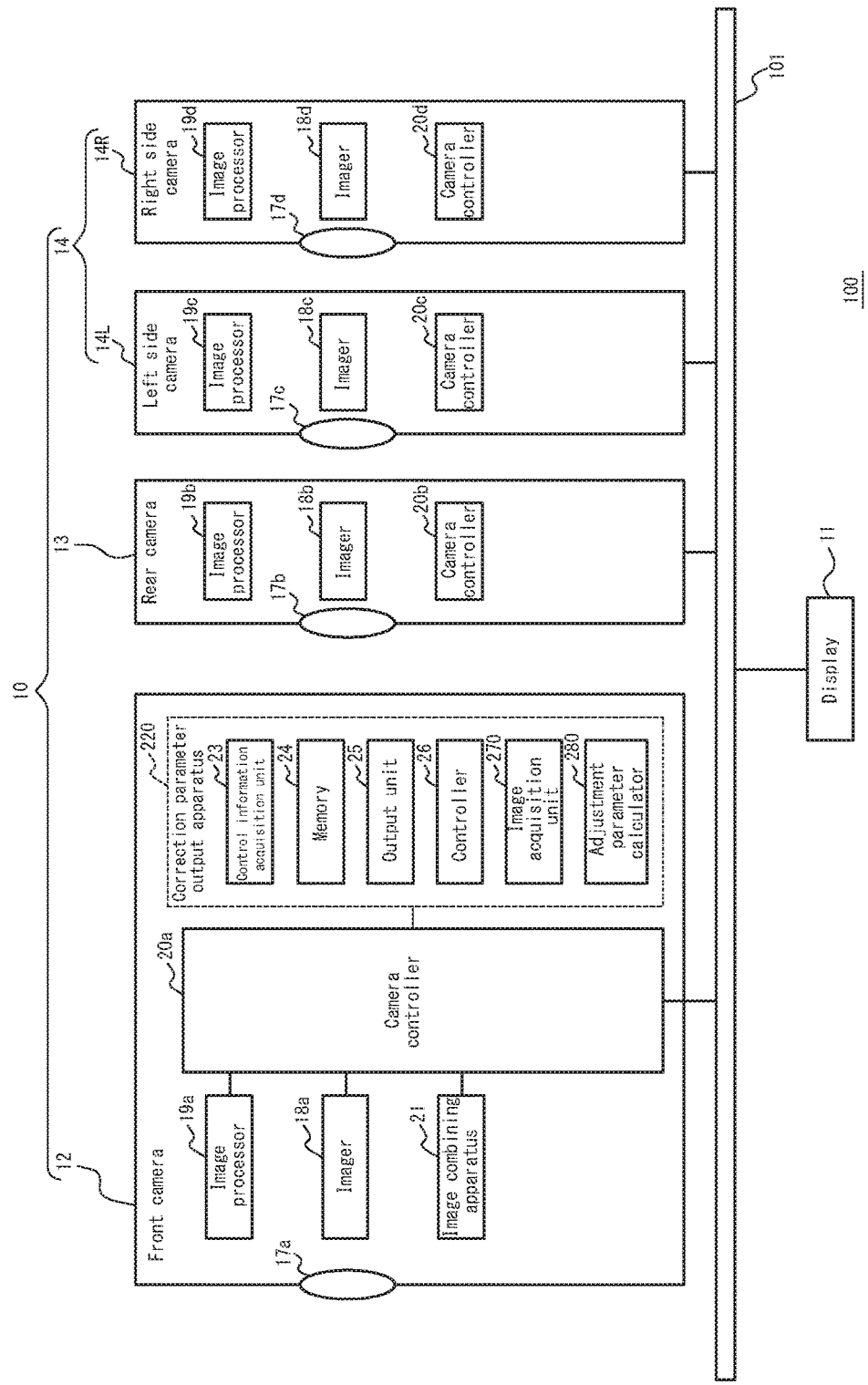
FIG. 7 is a function block diagram illustrating a schematic configuration of a camera system according to a second embodiment of this disclosure.

The image processors 19*a*, 19*b*, 19*c* and 19*d* (see FIG. 7) treat, as with the first embodiment, the images generated by the imagers 18*a*, 18*b*, 18*c* and 18*d* with image processing such as image conversion, color correction, luminance correction or the like. The image processors 19*a*, 19*b*, 19*c* and 19*d* according to this embodiment acquire adjustment parameters described later from the correction parameter output apparatus 220. For example, the image processors 19*a*, 19*b*, 19*c* and 19*d* perform image adjustment by multiplying the color signal component of the image by the acquired color adjustment parameter.

The correction parameter output apparatus 220 according to this embodiment includes a control information acquisition unit 23, a memory 24, an output unit 25, a controller 26, an image acquisition unit 270 and an adjustment parameter calculator 280. The configuration and function of the control information acquisition unit 23, the memory 24 and the controller 26 are the same as those of the first embodiment.

As with the first embodiment, the output unit 25 outputs a correction parameter included in a group of correction parameters corresponding to the control information acquired by the control information acquisition unit 23 to the image processors 19*a*, 19*b*, 19*c* and 19*d* of each camera 12, 13, 14L and 14R. Further, the output unit 25 of this embodiment outputs an adjustment parameter calculated by the adjustment parameter calculator 280 to the image processors 19*a*, 19*b*, 19*c* and 19*d* of each camera 12, 13, 14L and 14R.

The image acquisition unit 270 acquires images from the image processors 19*a*, 19*b*, 19*c* and 19*d* of each camera 12, 13, 14L and 14R.

The adjustment parameter calculator 280 calculates the adjustment parameter for adjusting a plurality of images acquired by the image acquisition unit 270. For example, the adjustment parameter calculator 280 calculates the adjustment parameter from the two-sage processing described below.

First, the first-stage processing will be described. The adjustment parameter calculator 280 defines one of a plurality of images acquired by the image acquisition unit 270 as a reference image. In this case, the image by the front camera 12 is defined as a reference image.

The adjustment parameter calculator 280 calculates, with respect to the reference image and adjacent images including respectively an area overlapped with the reference image (images by the side cameras 14L and 14R), an average value of the color signal component of image in each overlapped area (FLA, FRA).

The adjustment parameter calculator 280 calculates, when the difference in the color signal component average values between the reference image and the adjacent image is larger than the predetermined threshold, that is, when the average color difference between the reference image and the adjacent image is large, the color adjustment parameter to multiply the color signal component of the adjacent image to reduce the difference in colors. For example, the adjustment parameter calculator 280 calculates the color adjustment parameter of the adjacent image so that the difference in the average values will be less than the predetermined threshold, or so that the average value of the adjacent image will be the same as the average value of the reference image.

Then, the adjustment parameter calculator 280 outputs the color adjustment parameter to the side cameras 14L and 14R via the output unit 25.

When the image acquisition unit 270 acquires the image by the side cameras 14L and 14R adjusted based on the color adjustment parameter calculated as described above, the adjustment parameter calculator 280 performs the second stage described below.

The adjustment parameter calculator 280 calculates, with respect to the images by the side cameras 14L and 14R and third images (images by the rear camera 13) that contain respectively areas overlapped with the images by the side cameras and are different from the reference image, the average value of color signal components of each overlapped area (ReLA, ReRA).

The adjustment parameter calculator 280 calculates the average value A between the average value of the color signal component of the image by the left side camera 14L and that by the right side camera 14R. Further, the adjustment parameter calculator 280 calculates the average value B between the average value of the color signal component of the image by the rear camera 13 in the overlapped area ReLA and that by the rear camera 13 in the overlapped area ReRA.

The adjustment parameter calculator 280 calculates, when the difference between the average value A and the average value B is larger than the predetermined threshold, for example, the color adjustment parameter of the image by the rear camera 13 so that the difference between the average values will be less than the predetermined threshold or so that the average value B will be the same as the average value A.

Then, the adjustment parameter calculator 280 outputs the calculated color adjustment parameter to the rear camera 13 via the output unit 25.

It is preferred that the adjustment parameter calculator 280 determines which of a plurality of images acquired by the image acquisition unit 270 to be defined as the above described reference image based on the control information acquired by the control information acquisition unit 23. Here, the control information includes the information indicating the direction of travel of the moving object 15. The adjustment parameter calculator 280 determines the direction of travel of the moving object 15 based on the control information, and defines, for example, the image by the front camera 12, the image by the rear camera 13, and images by the side cameras 14 (14L and 14R) as a reference image when driving forward, driving backward, making a left or a right, respectively.

Next, the processing executed by the camera system 100 according to the second embodiment will be described with reference to the flow chart of FIG. 8. This processing is started when the image capturing apparatus 10 is activated, for example, and is executed repeatedly until a termination instruction is given by the user.

From the step S200 to the step S203, the same processing as that from the step S100 to the step S103 in the first embodiment is performed.

Subsequently, each camera controller 20a, 20b, 20c and 20d controls the image processor 19, and corrects bird's eye view images of step S203 respectively based on the correction parameter of step S202 (step S204), and outputs the corrected bird's eye view images to the correction parameter output apparatus 220.

Next, the correction parameter output apparatus 220 defines one of the plurality of bird's eye view images corrected at step S204 based on the control information of the step S200 as a reference image (step S205). Here, the image by the front camera 12 is defined as a reference image.

Subsequently, the correction parameter output apparatus 220 calculates the color adjustment parameter for adjusting the images by the side cameras 14L and 14R based on the color signal component of the images by the side cameras 14L and 14R among the reference image and the plurality of bird's eye view images corrected at the step S204 (step S206), and outputs the parameter to the side cameras 14L and 14R.

Next, the side cameras 14L and 14R adjust the images by the side cameras 14L and 14R corrected at step S204 based on the color adjustment parameter of the step S206 (step S207), and output the adjusted images to the correction parameter output apparatus 220.

Next, the correction parameter output apparatus 220 calculates the color adjustment parameter for adjusting the image by the rear camera 13 based on the color signal component of the image by the side cameras 14L and 14R adjusted at the step S207 and the color signal component of the image by the rear camera 13 adjusted at the step S204 (step S208) and outputs the parameter to the rear camera 13.

Next, the rear camera 13 adjusts the image by the rear camera 13 corrected at the step S204 based on the color adjustment parameter of the step S208 (step S209).

Subsequently, each camera 12, 13, 14L and 14R outputs the corrected or adjusted bird's eye view image to the correction parameter output apparatus 22 (step S210), more specifically, outputs the image by the front camera 12 adjusted at the step S204, the images by the side cameras 14L and 14R adjusted at the step S207 and the image by the rear camera 13 adjusted at the step S209.

Next, the image combining apparatus 21 generates a combined image of the bird's eye view images of the step S210 (step S211) and outputs the image to the display apparatus 11.

Then, the display apparatus 11 displays the combined image of the step S211 (step S212).

In this manner, according to the camera system of the second embodiment, as with the camera system of the first embodiment, the camera system corrects the images by each camera 12, 13, 14L and 14R, then adjusts the images by each camera 12, 13, 14L and 14R based on the color signal component of the reference image, thus the visibility of the combined image can be improved.

Further, in the second embodiment, for example, a reference image is determined depending on the direction of travel of the moving object 15, thus the colors of other images are corrected corresponding to the color of the image that includes the area surrounding the moving object 15 to which the driver is paying attention, thus the visibility of the combined image can be further improved.

Although this disclosure has been described based on the drawings and the embodiments, it is to be noted that various changes and modifications will be easily made by those skilled in the art based on this disclosure. Therefore, such changes and modifications are to be understood as included within the scope of this disclosure.

For example, in the above described embodiments, although the image capturing apparatus 10 includes the front camera 12, the rear camera 13 and side cameras 14, it may include further cameras. For example, the image capturing apparatus 10 may further include a distant view camera that can capture an image of complete surrounding of the moving object 15.

Further, each component of the camera system of the above described embodiments can be divided or rearranged. For example, the image combining apparatus 21 and the correction parameter output apparatus 22 may be separated from the front camera 12 and be configured as an individual apparatus. Moreover, for example, a navigation system may be further provided, and the navigation system may be provided with the image combining apparatus 21 and the correction parameter output apparatus 22.

In the above described embodiments, for the correction parameter, any other parameters relating to correction of an image may be adopted. Further, for example, in the second embodiment, although the adjustment parameter calculator 280 calculates the color adjustment parameter, the adjustment parameter calculator 280 may calculate the luminance adjustment parameter with the same processing. In this case, for example, the image processors 19a, 19b, 19c and 19d perform an image adjustment by multiplying the luminance signal component of image by the luminance adjustment parameter.

Moreover, in the above described embodiments, although an explanation has been given assuming that the control information includes the time information, the information indicating lighting on of the lights of the moving object 15, the information indicating the direction of travel of the moving object 15, or the like, it may include any other information.

Further, in the above described embodiments, although a configuration in which the image processors 19a, 19b, 19c and 19d correct the photographed images (or bird's eye view images) generated by the imagers 18a, 18b, 18c and 18d has been explained, the apparatus may be configured such that a correction parameter is inputted, for example, to an AFE (Analog Front End) having a gain controller or a white balance controller, and the color and the luminance are corrected when an image is generated by the imagers 18a, 18b, 18c and 18d.

Moreover, in the above described embodiments, although the luminance correction parameter has been explained as a parameter to multiply the luminance signal component of the image, for example, it can be a parameter indicating an aperture value and a shutter speed. In this case, a luminance correction parameter is inputted to the controller of aperture and exposure time to adjust the luminance. Further, as a luminance correction parameter, a parameter to multiply the luminance signal component of the image and a parameter indicating an aperture value and a shutter speed may be combined for use.

Further, in the second embodiment, although the adjustment parameter calculator 280 calculates the correction parameter of the image by the rear camera 13 by using the color signal component of images by the left and right side cameras 14, the apparatus may be configured such that the correction parameter will be calculated by using the color signal component of the image of either the left or the tight side camera 14.

REFERENCE SIGNS LIST

10: Image capturing apparatus
11: Display apparatus
12: Front camera
13: Rear camera
14, 14L, 14R: Side camera
15: Moving object
16: Door mirror
17a, 17b, 17c, 17d: Optical system
18a, 18b, 18c, 18d: Imager
19a, 19b, 19c, 19d: Image processor
20a, 20b, 20c, 20d: Camera controller
21: Image combining apparatus
22, 220: Correction parameter output apparatus
23: Control information acquisition unit
24: Memory
25: Output unit
26: Controller
100: Camera system
101: Onboard network
270: Image acquisition unit
280: Adjustment parameter calculator

The invention claimed is:

1. An image correction parameter output apparatus, comprising:
a memory configured to store groups of correction parameters to be used to correct a plurality of images of an area surrounding a moving object captured with partially overlapped with each other by associating the groups with control information of the moving object; and
a controller configured to execute functions of:
an acquisition unit configured to acquire the control information of the moving object; and
an output unit configured to output a group of correction parameters corresponding to the acquired control information, wherein
each of the groups of correction parameters includes at least one of a set of color correction parameters respectively defined for the plurality of images and a set of luminance correction parameters respectively defined for the plurality of images; and
the set of color correction parameters and the set of luminance correction parameters are predetermined without using image data of the plurality of images.

2. The image correction parameter output apparatus according to claim 1, wherein the output unit outputs a different group of correction parameters depending on whether or not the control information includes information indicating lighting on of a light of the moving object.

3. The image correction parameter output apparatus according to claim 1, wherein the group of correction parameters includes a color correction parameter defined so as to reduce a difference in color between the plurality of images.

4. The image correction parameter output apparatus according to claim 1, wherein the controller is configured to execute functions of:
an image acquisition unit configured to acquire a plurality of images corrected based on the group of correction parameters outputted by the output unit; and
a calculator configured to define one of the plurality of corrected images as a reference image, and based on a color signal component in an overlapped area between the reference image and an another corrected image, to calculate a color adjustment parameter to be used to adjust the another corrected image, wherein the output unit outputs the calculated color adjustment parameter.

5. The image correction parameter output apparatus according to claim 4, wherein
the image acquisition unit acquires an image adjusted based on the color adjustment parameter outputted by the output unit;
the calculator calculates a color adjustment parameter to be used to adjust the corrected image based on a color signal component in an overlapped area between the adjusted image and a corrected image different from the reference image; and
the output unit outputs the calculated color adjustment parameter.

6. The image correction parameter output apparatus according to claim 4, wherein the reference image is defined from among the plurality of corrected images based on the control information.

7. The image correction parameter output apparatus according to claim 6, wherein the reference image is defined from among the plurality of corrected images based on information indicating a direction of travel of the moving object included in the control information.

8. A camera system, comprising:
a plurality of cameras configured to generate a plurality of images of an area surrounding the moving object captured with partially overlapped with each other;
a memory configured to store groups of correction parameters to be used to correct the plurality of images by associating the groups with control information of the moving object;
a controller configured to execute functions of:
an acquisition unit configured to acquire the control information of the moving object; and
an output unit configured to output a group of correction parameters corresponding to the acquired control information; and
a camera controller configured to execute functions of:
an image processor configured to correct the plurality of images based on a correction parameter outputted by the output unit; and an image combining unit configured to combine the plurality of corrected images to generate a combined image, wherein each of the groups of correction parameters includes at least one of a set of color correction parameters respectively defined for the plurality of images and a set of luminance correction parameters respectively defined for the plurality of images; and the set of color correction parameters and the set of luminance correction parameters are predetermined without using image data of the plurality of images.

9. An image correction parameter output method comprising the steps of:

storing groups of correction parameters to be used to correct a plurality of images of an area surrounding a moving object captured with partially overlapped with each other by associating the groups with control information of the moving object;

acquiring the control information of the moving object; and outputting a group of correction parameters corresponding to the acquired control information, wherein each of the groups of correction parameters includes at least one of a set of color correction parameters respectively defined for the plurality of images and a set of luminance correction parameters respectively defined for the plurality of images; and the set of color correction parameters and the set of luminance correction parameters are predetermined without using image data of the plurality of images.

* * * * *